Aug. 9, 1949.   W. N. BELK   2,478,176
FISHING ROD OR POLE HOLDER
Filed June 21, 1946
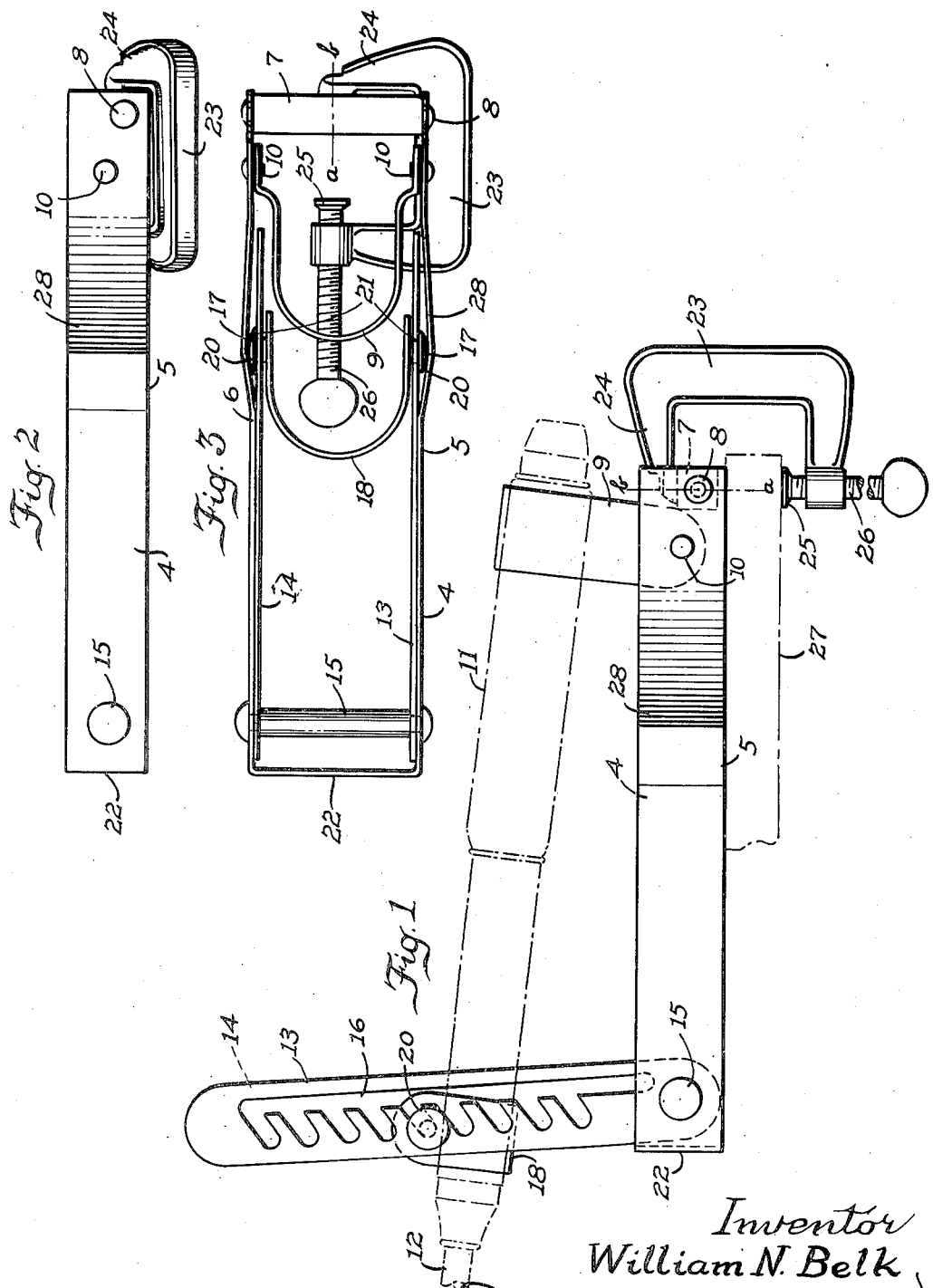
Inventor
William N. Belk Patented Aug. 9, 1949

2,478,176

UNITED STATES PATENT OFFICE 2,478,176

FISHING ROD OR POLE HOLDER

William N. Belk, Rockford, Ill., assignor of one-half to Andrew F. Wintercorn, Rockford, Ill.

Application June 21, 1946, Serial No. 678,199

7 Claims. (Cl. 248—42)

This invention relates to a fishing rod or pole holder especially designed for use in a rowboat to permit a fisherman to troll while rowing his boat.

I am aware that devices of this general description have been provided heretofore but so far as I am aware they have been too complicated and expensive in construction and were not practical because they were not sufficiently adjustable to suit all requirements. It is, therefore, the principal object of my invention to provide a simpler and more economical holder and one which has a wider range of adjustability to suit all requirements.

Another object is to provide a holder that is foldable to a compact size so as to fit readily in a tackle box, the holder when unfolded and set up for use being nevertheless quite strong and rigid and not at all apt to collapse regardless of violent jerks on the line or the direction of the pulls exerted on the rod or pole in use.

Another object is to provide a holder, most of the parts of which can be made from strips of sheet metal for lightness, economy and durability.

The invention is illustrated in the accompanying drawing, in which

Fig. 1 is a side view of a fishing rod or pole holder made in accordance with my invention, the same being shown as when unfolded and set up for use in a row-boat, and Figs. 2 and 3 are a side and top view of the holder shown folded for storage in the tackle box.

The same reference numerals are applied to corresponding parts in these three views.

Referring to the drawing, the reference numeral 4 designates the U-shaped sheet metal base or frame, the free ends of the arms 5 and 6 of which are held in fixed spaced relation by a cross-bar 7 that is pivotally connected at its ends to said arms by trunnions 8 that are preferably upset on their outer ends, as shown in Fig. 3. A U-shaped sheet metal yoke 9 is pivoted, as at 10, at the ends of its arms between the arms 5—6 of the base, near the cross-bar 7, and is adapted to straddle from above the butt end of the handle 11 of a fishing rod or pole 12, as appears in Fig. 1. Two arms or brackets 13 and 14 are pivoted, as by a cross-pin 15, to the inner sides of the arms 5 and 6 near the other end of the base 4, and are slotted lengthwise, as at 16, for reception of studs or trunnions 17 that project outwardly from the arms of another U-shaped sheet metal yoke 18. The latter is like the yoke 9 and straddles from below the front end portion of the handle 11 for cooperation with yoke 9 for good support of the fishing rod or pole 12. The studs 17 are coaxially aligned and are adapted to be detachably pivotally engaged in coaxially aligned notches 19 provided in the brackets 13—14 on the outer side of the slots 16 relative to the yoke 9. The notches are spaced uniformly lengthwise of the brackets 13—14 so that yoke 18 may be set higher or lower with reference to the brackets 13—14 depending on the inclination desired for the fishing rod or pole 12. The slots 16 and notches 19 are all narrow in relation to the heads 20 on the studs 17 so that the yoke 18 cannot become disconnected from either of the brackets 13 and 14. The heads 20, furthermore, have their wide flat inner sides 21 in close working contact with the outer sides of the brackets 13—14 so as to guide the yoke 18 in its sliding adjustment up and down to prevent its binding by reason of one side of the yoke getting higher than the other. Both yokes 9 and 18, being free to pivot, will assume positions substantially parallel to one another and substantially at right angles to the handle 11 of the fishing rod or pole 12 when they assume support thereof, as clearly appears in Fig. 1. The brackets 13—14 are limited in their pivotal movement relative to base 4 by abutment with the cross-portion 22 at the front end of the base 4, as appears in Fig. 1, the brackets in this limit position having been moved sufficiently past a vertical dead center position to eliminate any likelihood of their collapsing under load. This is, of course, quite important for the successful operation of the holder. Some prior holders were faulty in this regard, relying too much upon accurate interfitting of parts in notches and therefore lacking the safety and rigidity which I obtain by the simple expedient of having the parts 13 and 14 swingable past a dead center, these parts being sufficiently independent of one another to permit both to be positively engaged with the inner side of the cross portion 22 of the base.

A C-clamp 23 of any suitable or preferred construction is suitably pivoted by its fixed jaw 24 on an axis $a$—$b$ at right angles to the middle of the cross-bar 7, and has a movable jaw 25 adjustable by means of the thumb screw 26 to permit clamping the base 4 of the holder securely to the seat or other suitable support in a rowboat, as indicated at 27 in Fig. 1. The base 4 can be swung around the axis $a$—$b$ as a center through nearly 180° to support a rod or pole on either side of the boat and at any desired lateral angle. After the lateral angle is selected the thumb screw 26 is tightened to clamp the base 4 in that position. Then the desired vertical angle adjustment for the rod or pole is obtained by adjusting the yoke 18 up or down in the brackets 13—14.

The holder is foldable to the compact size shown in Figs. 2 and 3. The yoke 9 is swung in a counter-clockwise direction into the plane of the base 4, and brackets 13 and 14 are swung in a clockwise direction into the same plane, the yoke 18 being shifted, if necessary, to avoid the yoke 9 and being disposed in the plane of the base also. There are slight bulges 28 formed in the arms 5 and 6 intermediate their ends, as best appears in Fig. 3, to provide clearances for the heads 20 of the studs 17.

The C-clamp 23 when detachably pivotally connected to the cross-bar will, when detached, fit neatly in the space left in the base 4 to the left of yoke 18 and thus make for even greater compactness than appears in Figs. 2 and 3, wherein the clamp is shown as merely folded into the plane of the base as much as possible.

It is believed the foregoing description conveys a good understanding of the objects and advantages of my invention. The appended claims have been drawn to cover all legitimate modifications and adaptations.

I claim:

1. A rod or pole holder comprising a U-shaped horizontal frame providing a front cross-portion and rearwardly extending arms in substantially parallel relation, means holding the rear ends of said arms in fixed spaced relation and carrying means for attaching said frame to a suitable support in a substantially horizontal position, brackets pivoted on a horizontal axis to the inner sides of said arms near the front cross-portion and swingable past a vertical dead center into abutment with said cross-portion for support, a downwardly looped front yoke pivotally supported on the brackets on a horizontal axis extending transversely relative to the arms of said frame, said brackets having longitudinal slots provided therein extending throughout an appreciable portion of the length of said brackets on one side of which slots are provided longitudinally spaced notches adapted to receive detachably the pivot portions of said front yoke for vertical adjustment of said yoke relative to said brackets and frame, and an upwardly looped rear yoke pivoted in the rear portion of said frame on a horizontal axis extending transversely relative to the arms of said frame to cooperate with the front yoke to support a rod or pole.

2. A rod or pole holder comprising a U-shaped horizontal frame providing a front cross-portion and rearwardly extending arms in substantially parallel relation, brackets pivoted on a horizontal axis to the inner sides of said arms near the front cross-portion and swingable past a vertical dead center into abutment with said cross-portion for support, a downwardly looped front yoke pivotally supported on the brackets on a horizontal axis extending transversely relative to the arms of said frame, an upwardly looped rear yoke pivoted in the rear portion of said frame on a horizontal axis extending transversely relative to the arms of said frame to cooperate with the front yoke to support a rod or pole and means for detachably securing said frame to a suitable support in a substantially horizontal position.

3. A foldable rod or pole holder of sheet metal construction, comprising a U-shaped frame made of a bent strip of sheet metal, means for attaching the frame to a support, two brackets made of strips of sheet metal of appreciably less length than the arms of the frame pivoted therein near the cross-portion for support in a raised forwardly inclined position abutting the cross-portion, a downwardly looped front yoke pivotally supported on the brackets on a horizontal axis extending transversely relative to the arms of said frame, said bracket having longitudinal slots provided therein extending throughout an appreciable portion of the length of said brackets on one side of which slots are provided longitudinally spaced notches adapted to receive detachably the pivot portions of said front yoke for vertical adjustment of said yoke relative to said brackets and frame, and an upwardly looped rear yoke pivoted in the rear portion of said frame on a horizontal axis extending transversely relative to the arms of said frame to cooperate with the front yoke to support a rod or pole, the rear yoke being disposed beyond the end of the brackets in their folded position, whereby these parts are all foldable into the plane of the frame.

4. A foldable rod or pole holder of sheet metal construction, comprising a U-shaped frame made of a bent strip of sheet metal, means for attaching the frame to a support, two brackets made of strips of sheet metal of appreciably less length than the arms of the frame pivoted therein near the cross-portion for support in a raised forwardly inclined position abutting the cross-portion, a downwardly looped front yoke pivotally supported on the brackets on a horizontal axis extending transversely relative to the arms of said frame, said brackets having longitudinal slots provided therein extending throughout an appreciable portion of the length of said brackets, lengthwise of which the pivot portions of said front yoke are adjustable for vertical adjustment of said yoke relative to said brackets and frame and an upwardly looped rear yoke pivoted in the rear portion of said frame on a horizontal axis extending transversely relative to the arms of said frame to cooperate with the front yoke to support a rod or pole, the rear yoke being disposed beyond the end of the brackets in their folded position, whereby these parts are all foldable into the plane of the frame.

5. A foldable rod or pole holder of sheet metal construction, comprising a U-shaped frame made of a bent strip of sheet metal, two brackets made of strips of sheet metal of appreciably less length than the arms of the frame pivoted therein near the cross-portion for support in a raised forwardly inclined position abutting the cross-portion, a downwardly looped front yoke pivotally supported on the brackets on a horizontal axis extending transversely relative to the arms of said frame for vertical adjustment throughout an appreciable portion of the length of said brackets, there being a longitudinally extending slot provided in each of said brackets and downwardly inclined notches in said brackets opening from said slots in longitudinally spaced relation and said front yoke having trunnions detachably pivotally engageable in selected notches, an upwardly looped rear yoke pivoted in the rear portion of said frame on a horizontal axis extending transversely relative to the arms of said frame to cooperate with the front yoke to support a rod or pole, the rear yoke being disposed beyond the end of the brackets in their folded position, whereby these parts are all foldable into the plane of the frame, and a cross-bar connecting and spacing the free ends of the arms of the U-frame and carrying a clamping device for attaching the frame to a support.

6. A device as set forth in claim 5 in which the trunnions on the front yoke have enlarged heads on their outer ends slidably engaging the outer sides of the brackets alongside the slots and notches, and the arms of said U-frame are bent intermediate their ends to provide outwardly bulged portions behind which the heads of the trunnions may be received when the holder is folded.

7. A rod or pole holder comprising an elongated horizontal U-shaped frame having spaced side portions in substantially parallel relation, elongated brackets of substantially less length than the frame pivoted at one end on a horizontal axis to the inner sides of said side portions at one end of said frame and swingable upwardly from a folded inoperative position in the plane of the frame past a vertical dead-center to an operative position in abutment with stop means rigid with said side portions for rigid support of said brackets in the upright position, a downwardly looped front yoke adjustably supported on and between the brackets for vertical adjustment to different elevations relative to said frame, an upwardly looped rear yoke pivoted independently of the front yoke in the rear portion of said frame on a horizontal axis extending transversely relative to said frame to cooperate with the front yoke in supporting a rod or pole, the rear yoke being disposed beyond the end of the brackets in their folded position, whereby these parts are all foldable into the plane of the U-frame, the cross-portion of the U-frame holding that end of the side portions in rigidly spaced substantially parallel relation to one another, and means connecting the free ends of the side portions together in rigidly spaced substantially parallel relationship to one another and including means for detachably securing said frame to a suitable support in a substantially horizontal position.

WILLIAM N. BELK.

REFERENCES CITED

The following references are of record in the file of this patent:

UNITED STATES PATENTS

| Number | Name | Date |
|--------|------|------|
| 806,790 | Foersterling | Dec. 12, 1905 |
| 1,776,425 | Geisinger | Sept. 23, 1930 |
| 1,831,190 | Parker | Nov. 10, 1931 |
| 2,317,445 | Davidson et al. | Apr. 27, 1943 |